United States Patent Office 2,993,157
Patented July 18, 1961

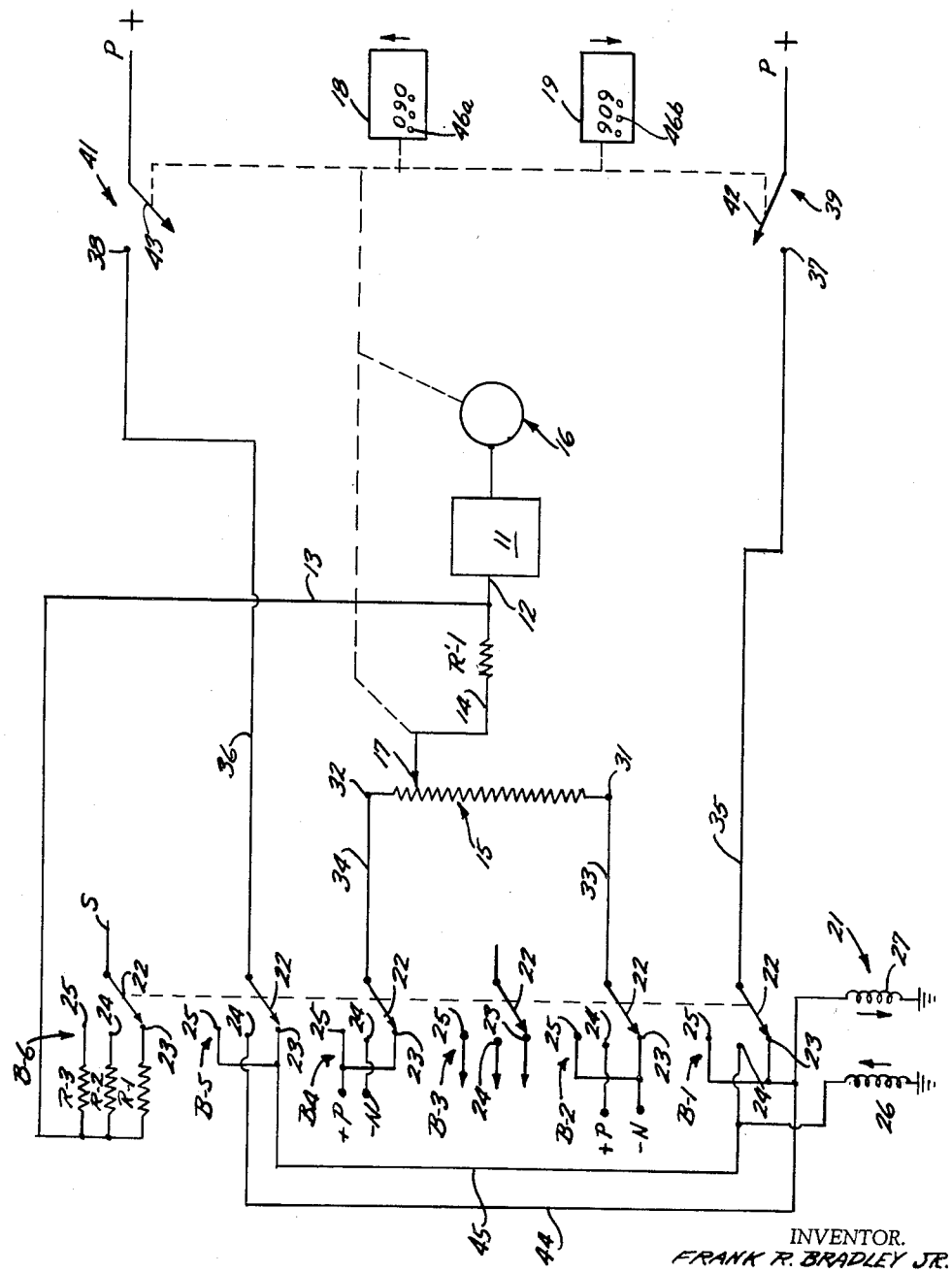

1

2,993,157
AUTOMATIC RANGE SWITCHING SERVOSYSTEM
Frank R. Bradley, Jr., 215 W. 88th St., New York, N.Y.
Filed Nov. 10, 1958, Ser. No. 772,909
14 Claims. (Cl. 318—28)

This invention relates to the art of automatic range switching.

As conducive to an understanding of the invention, it is noted that where, for example, in a potentiometer follow up servo where increments of a signal tapped off a potentiometer are compared with an input signal to be measured and each time the end of the range of the potentiometer is reached the tapping means must be moved back to the starting point thereon for the next comparing range, the retrace takes considerable time which is extremely serious where the unit is part of a computer into which data is continuously fed.

It is accordingly among the objects of the invention to provide an automatic range switching equipment which is relatively simple in construction and dependable in operation and which will switch from one range to another whether increasing or decreasing with no appreciable retrace time.

According to the invention, these objects are accomplished by the arrangement and combination of elements hereinafter described and particularly recited in the claims.

In the accompanying drawings in which is shown one of various possible embodiments of the several features of the invention, the single figure is a circuit diagram of one embodiment of the invention.

Referring now to the drawings, the equipment comprises a servo-amplifier 11, the input 12 of which is fed through lead 13 by the source signal S to be measured and through lead 14 by a voltage from a balancing potentiometer 15.

When the inputs to the servo-amplifier 11 are not equal and opposite, an output signal will be fed by the servo-amplifier 11 to a servo-motor 16 which is mechanically ganged with the wiper arm 17 of the potentiometer 15 and also with counters 18 and 19, the former increasing in value from a minimum to maximum and the latter decreasing in value from maximum to minimum.

In the illustrative embodiment shown, the equipment has three decade ranges and a bi-directional stepping switch 21 is provided having six banks B–1 to B–6, each with a movable contact arm 22 and three associated fixed contacts 23, 24, 25, the stepping switch being controlled by step up coil 26 and step down coil 27.

The ends 31, 32 of potentiometer 15 are connected by leads 33, 34 to contact arms 22 of banks B–2 and B–4. The contacts 23 and 25 of bank B–2 are connected to negative main N and the contact 24 of bank B–2 is connected to positive main P. The contacts 23 and 25 of bank B–4 are connected to positive main P and the contact 24 of bank B–4 is connected to negative main N.

The contact arm 22 of bank B–6 is adapted to be connected to the signal S to be measured and the contacts 23, 24, 25 of bank B–6 are connected through range resistors R–1, R–2, R–3 to lead 13. The resistor R–1 is illustratively the same value as a resistor R′–1 in series with wiper 17 and input terminal 12 so that with a given voltage across the potentiometer 15, different ranges may be secured.

The contact arms 22 of banks B–1 and B–4 are connected by leads 35, 36 to the fixed contacts 37, 38 of normally open range switches 39, 41, the movable contact arms 42, 43 of which are connected to positive main P. The switches are momentarily closed by suitable linkage driven by motor 16 at each limit of a given range in the manner hereinafter described.

2

The contact 23 of bank B–1 is connected to contact 25 and also to one end of coil 27, the other end of which is connected to ground and by lead 44 to contact 24 of bank B–5. The contact 24 of bank B–1 is connected to one end of coil 26, the other end of which is connected to ground and by lead 45 to contacts 23 and 25 of bank B–5.

The contacts 23, 24, 25 of bank B–3 are connected to suitable decimal indicators 46 associated with the counters 18, 19 and also with masks (not shown) associated with the counters so that the reading on one or the other counter will be visible.

In the operation of the equipment, assuming that the ranges are decade ranges, i.e., 0–1, 1–10 and 10–100 and that there are three ranges, the resistors R–1 and R′–1 are equal: the resistor R–2 has a value 10 times R–1 and the resistor R–3 has a value 100 times R–1. The counter 18 has three digits and will show an increasing indication from 090 to 909, and the counter 19 which also has three digits will show a decreasing indication from 909 to 090.

The switches 39 and 41 are designed to be momentarily actuated when the wiper arm 17 reaches a position that is illustratively equal to $$\frac{1}{N+1}$$

of the distance from the effective ends 31, 32 of the potentiometer, i.e., in the illustrative embodiment shown, where decade range switching is employed and $N=10$, such switching position being equal to $\frac{1}{11}$ of the distance from the ends 31, 32 respectively.

Assuming that the value of the input signal S is —4.54 volts and the voltage applied to the potentiometer is 1 volt and that the stepping switch is at range 1 with the contact arms 22 engaging fixed contacts 23, the end 31 of the potentiometer 15 will be negative (or at ground potential) and the end 32 positive one volt.

As contact arm 22 of bank B–3 is engaging fixed contact 23, the counter 19 will be concealed by the associated mask and the decimal indicator 46a of counter 18 will be illuminated.

Assuming that the wiper arm 17 is adjacent the end 31 of the potentiometer, the servo-amplifier 11 will be unbalanced as the input signal S (—4.54 volts) is greater than the voltage tapped from the potentiometer.

As a result, the servo-motor 16 will be energized to advance the wiper arm in direction toward end 32 of the potentiometer and the counter 18 will increase in value while the concealed counter 19 will decrease in value.

When the wiper arm 17 reaches a position that is $$\frac{1}{N+1}$$

or $\frac{1}{11}$ of the way from end 32 which is $\frac{10}{11}$ of the way from the negative or grounded end 31 of the potentiometer, the value of the voltage tapped from the potentiometer will be $\frac{10}{11}$ of one volt or .909 volt and the counter 18 will indicate a value representing the position of the wiper 17, i.e., .909 of the effective length of potentiometer 15. However, at such time the switch 41 will be closed momentarily.

As a result, current will flow from positive main P, closed switch 41, lead 36, contact arm 22 and fixed contact 23 of bank B–5, lead 45 to step up coil 26 to energize the latter. This will cause the contact arms 22 of stepping switch 21 to advance to engage contacts 24.

When contact arm 22 of bank B–1 engages its contact 24, the coil 26 will be readied for actuation by the switch 39. When contact arms 22 of banks B–2 and B–4 engage their contacts 24, the polarity of the voltage across potentiometer 15 will be reversed so that end 31 is now positive and end 32 negative or at ground potential. When contact arm 22 of bank B-3 engages its fixed contact 24, the mask will be moved over counter 18 to conceal its indication and the mask associated with counter 19 will be moved clear to expose the indication which has moved from 909 to 090 and the decimal indicator 46b will be illuminated to indicate 0.90. When the contact arm 22 of bank B-6 engages its fixed contact 24, the resistor R-2 of value 10 times that of R'-1 will be placed into circuit so that the current applied to input 12 due to the input signal S, i.e. −4.54 volts, will be reduced by a factor of 10, i.e., to −.454 volt.

With the wiper arm 17 of the potentiometer at a position $$\frac{1}{N+1}$$

or $\frac{1}{11}$ of the way from end 32 which is now negative, or at ground potential, since the voltage across the potentiometer is fixed, i.e., one volt, but in the opposite sense, the voltage applied to input terminal 12 from wiper 17 will be $\frac{1}{11}$ of one volt or 0.09 volt. The reading on counter 19 at this time is correct as the decimal indicator 46b is illuminated so that the counter will indicate 0.90.

However, as the input signal S is −.454 volt, the servo-amplifier 11 will still be unbalanced but in the opposite direction and the servo-motor 16 will now rotate to reduce the reading on counter 18 which is concealed and increase the reading on counter 19 which is visible.

When the wiper arm of potentiometer 15 which is now moving toward end 31 reaches a position such that the voltage tapped from the potentiometer equals S/10 or −.454, the servo-amplifier will be in balance and the counter 19 will indicate 4.54 as the decimal indicator 46b is energized.

The equipment has thus far been described with respect to an increasing count. It functions in a similar manner with respect to a decreasing count.

Thus, assuming that the wiper 17 is at a position in range two, representing a value of −4.45 volts and the input signal S in should decrease to −.454 which, when divided by a factor of 10 would equal .0454 volt applied to input 12.

The servo-amplifier would be unbalanced and the wiper arm would start to move toward end 32 of the potentiometer at the same time driving the counter 19 to a lower indication.

When the wiper arm 17 reached a position $\frac{1}{11}$ of the way from end 32, the counter 19 would show .909. At this time the switch 41 would be closed to complete a circuit from positive main P, through closed switch 41, lead 36, contacts 22, 24 of bank B-5, lead 44 and step down coil 27 to ground.

As a result, the contact arms 22 of banks B-1 to B-6 would be moved to contacts 23. In this position, the counter 19 would be concealed and counter 18 which is now at position .909 with the decimal indicator 46a energized, would be exposed.

In addition, the polarity of the potential to the potentiometer would be reversed and range resistor R-1 connected into circuit.

However, as the input signal is now −.454 volt, the servo-amplifier 11 would still be unbalanced and motor 16 would move the wiper arm 17 toward end 31 of the potentiometer and at the same time reduce the reading on exposed counter 18. When the wiper arm reaches a position such that the voltage tapped from the potentiometer equals S or −.454 volt the servo-amplifier will be in balance and the counter 18 will indicate .454 volt.

Although in the illustrative examples given decade ranges are employed, it is of course within the scope of the invention to employ any desired range. Thus, the movement of the wiper arm 17 to effect switching of ranges occurs between $$\frac{1}{N+1}$$

and $$\frac{N}{N+1}$$

where $N$ = the range and the resistors R-1, R-2 and R-3 would have values of R, NR and $N^2R$.

If desired, instead of employing the resistors R, R-1 and R-2 and R'-1, voltage could be connected across potentiometer 15 of value equal to 1, $N \cdot 1$ and $N^2 \cdot 1$ respectively.

It is further to be understood that instead of the switches 39 and 41 being actuated at positions $$\frac{1}{N+1}$$

and $$\frac{N}{N+1}$$

respectively, the values of N in such fractions could deviate slightly from the value of the range factor N.

It is apparent from the foregoing that the physical location of the wiper arm 17 of the potentiometer is substantially the same at the end of one range and the beginning of the next range. Consequently, there will be no retrace required from one range to the other.

This is especially valuable in the computer art for since the time elapsed to switch from one range to another is merely the switching time of the switch 21 which is in the order of a few milliseconds and hence is negligible, data may be continuously fed for solution. In such application, the read-out counters might be eliminated, and data transmitting medium such as potentiometers could be used.

It is of course to be understood that any desired number of ranges could be provided by merely increasing the number of contacts of the switch 21 and providing additional digits and decimal indications on the counters 18 and 19.

As many changes could be made in the above system and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Range switching equipment comprising a potentiometer, means to apply a signal across said potentiometer, means to tap off from said potentiometer increments of the signal applied thereacross, a balancing circuit having an input, means to feed an input signal and the signal tapped off said potentiometer to the input of said balancing circuit, a variable output device controlled by the output of said balancing circuit and adapted to be set to a position related to the position of said tapping means, and means to change the polarity of the signal applied across said potentiometer and to change the relation between the values of the input signal and the signal across the potentiometer by a given factor when the tapping means has moved to a position with respect to the potentiometer such that the value of the signal tapped off the potentiometer at such position is substantially equal to its value prior to changing the polarity of the signal across the potentiometer.

2. The combination set forth in claim 1 in which the given factor has a value of N and the means to change the polarity of the signal applied across the potentiometer is actuated when the tapping means has moved to a position with respect to the adjacent end of the potentiometer corresponding substantially to $$\frac{1}{N+1}$$

of the effective excitation of the potentiometer.

3. The combination set forth in claim 1 in which the given factor has a value of N and the means to change the polarity of the signal applied across said potentiometer and to change the relation between the values of the input signal and the signal across the potentiometer is actuated when the tapping means has moved to a position with respect to each of the ends of the potentiometer corresponding substantially to $$\frac{1}{N+1}$$

of the effective excitation of the potentiometer.

4. The combination set forth in claim 1 in which the signal applied across the potentiometer is a constant and the effective value of the input signal applied to the input of the balancing circuit is changed by said given factor.

5. The combination set forth in claim 1 in which the value of the signal across the potentiometer is changed by said given factor.

6. The combination set forth in claim 1 in which the variable output device comprises a counter adapted to be set to a position corresponding to the postion of the tapping means of said potentiometer.

7. The combination set forth in claim 1 in which the variable output device comprises a pair of variable units each adapted to be set to a position corresponding to the position of the tapping means of said potentiometer, one of said units decreasing in value and the other simultaneously increasing in value as the position of said tapping means is changed, and switch means are provided alternately to render operative said variable units.

8. The combination set forth in claim 1 in which the variable output device comprises a pair of counters each adapted to be set to a position corresponding to the position of the tapping means of said potentiometer, one of said counters decreasing in value and the other simultaneously increasing in value.

9. The combination set forth in claim 8 in which means are provided alternately to conceal the indications on said counters.

10. The combination set forth in claim 8 in which a decimal indicator is associated with each of the digits on said counters and means are provided successively to actuate said decimal indicators.

11. Range switching equipment comprising a potentiometer, a relay having a plurality of banks each having a contact arm and a plurality of fixed contacts successively engaged thereby, a coil controlling said contact arms, means connecting the effective ends of said potentiometer to the contact arms of two of said banks, means to apply a signal differing in polarity to successive fixed contacts of each of said two banks, the polarity of the signal to associated fixed contacts of said two banks also differing in polarity, means to tap off from said potentiometer increments of the signal applied thereacross, a balancing circuit having an input, means to feed an input signal and the signal tapped off said potentiometer to the input of said balancing circuit, a variable output device controlled by the output of said balancing circuit and adapted to be set to a position related to the position of said tapping means, means to change the polarity of the signal applied across the potentiometer and to change the relation between the values of the input signal and the signal across the potentiometer by a given factor, said means comprising switch means comprising a switch having a pair of normally open contacts, one of said contacts being adapted to be connected to a source of potential and the other being connected to the contact arm of another bank of said relay, said last named bank having one of its fixed contacts connected to said coil, and means controlled by the output of said balancing circuit to actuate said switch to effect movement of the contact arms to engage the adjacent fixed contact when the tapping means has moved to a position adjacent one end of said potentiometer such that the value of the signal tapped off said potentiometer at such position is substantially equal to its value prior to changing the polarity of the signal across the potentiometer.

12. The combination set forth in claim 11 in which said relay has an additional bank, and an additional coil also controlling said fixed contacts, one of said coils being a step up coil and the other a step down coil, to effect movement of the contact arms in opposed directions, said switch means includes an additional switch having a pair of normally open contacts, one of said contacts being adapted to be connected to a source of potential and the other being connected to the contract arm of said additional bank, said last named bank having one of its fixed contacts connected to said additional coil, means controlled by the output of said balancing circuit to actuate said additional switch to effect movement of the contact arm of said additional bank to engage the adjacent fixed contact when the tapping means has moved to a position adjacent the other end of said potentiometer such that the value of the signal tapped off said potentiometer at such position is substantially equal to its value prior to changing the polarity of the signal across the potentiometer.

13. The combination set forth in claim 12 in which alternate fixed contacts of said pair of banks and said another and additional banks are electrically connected respectively.

14. The combination set forth in claim 12 in which a second additional bank is provided, means to connect the input signal to the contact arm of said second additional bank, a plurality of resistors connected at one end respectively to the fixed contacts of said second additional bank and at their other ends to the input of said balancing circuit, a resistor in series between said input and the tapping means for said potentiometer, said resistors of said second additional bank increasing in value by such given factor with the first resistor having the value N and the series resistor having the value N.

References Cited in the file of this patent

UNITED STATES PATENTS

| | | |
|---|---|---|
| 2,781,482 | Montgomery | Feb. 12, 1957 |
| 2,861,233 | McKeown | Nov. 18, 1958 |